United States Patent [19]
Berger

[11] 4,089,258
[45] May 16, 1978

[54] GAS FIRED BARBECUE UNIT
[75] Inventor: Bernard B. Berger, Aiken, S.C.
[73] Assignee: Ducane Heating Corporation, Columbia, S.C.
[21] Appl. No.: 608,909
[22] Filed: Aug. 29, 1975
[51] Int. Cl.² .................................... A47J 27/026
[52] U.S. Cl. .................................. 99/339; 99/421 H; 99/446; 126/39 J; 126/41 R
[58] Field of Search .......... 99/339, 324, 340, 375–376, 99/385, 390, 393, 395, 400–401, 421, 425, 444, 446–447, 337; 126/39, 9 R, 41, 92 AC, 92 C

[56] References Cited
U.S. PATENT DOCUMENTS

| Re. 23,662 | 5/1953 | Larkin | 99/421 H |
|---|---|---|---|
| 706,502 | 8/1902 | Van Wie | 99/339 UX |
| 1,562,388 | 11/1925 | Taylor et al. | 126/39 J |
| 1,573,041 | 2/1926 | Davies | 99/377 |
| 1,766,075 | 6/1930 | Humphrey | 99/421 HH |
| 2,182,225 | 12/1939 | Garvis | 99/421 H X |
| 2,245,220 | 6/1941 | Nelson | 99/421 H |
| 2,379,239 | 6/1945 | Krebs | 99/421 HV |
| 2,826,984 | 3/1958 | Krull | 99/446 |
| 3,175,549 | 3/1965 | Bergsten | 99/441 H X |
| 3,182,585 | 5/1965 | Rensch et al. | 99/421 H X |
| 3,348,471 | 10/1967 | Lackewbauer | 99/421 HH |
| 3,363,543 | 1/1968 | Roberts | 99/421 HV |
| 3,369,481 | 2/1968 | Pappas | 99/446 X |
| 3,495,524 | 2/1970 | Miles | 2/197 O X |
| 3,757,671 | 9/1973 | Warshauer et al. | 99/446 X |

Primary Examiner—Harvey C. Hornsby
Assistant Examiner—Timothy F. Simone
Attorney, Agent, or Firm—Townsend M. Belser, Jr.

[57] ABSTRACT

A portable barbecue unit with a gas fired, vertically disposed heat source for roasting spit mounted foodstuffs. The vertical heat source includes an upstanding panel of radiant material extending along a tubular gas burner detachably mounted within the cooking enclosure to the side of the rotisserie spit. A modification combines the upstanding radiant panel with a horizontally disposed bed of radiant material underlying the spit and heated by an auxiliary gas burner.

9 Claims, 9 Drawing Figures

GAS FIRED BARBECUE UNIT

BACKGROUND OF INVENTION

This invention relates in general to an improved barbecue unit for spit cooking and grill cooking food outdoors on a patio or the like. More particularly, the invention is directed to a portable gas fired cooking unit having a vertical firebox for cooking spit mounted foodstuffs from the side and optionally having a horizontal firebox for enhancing spit cooking and for grill cooking from below.

Vertical fireboxes or baskets supporting burning charcoal have previously been used as sources of cooking heat for barbecue grills and the like. In some instances, the charcoal basket is movable between a vertical position and a horizontal position to permit grilling either from the side or from below. However, such grills lack versatility in that the heat source must be in one position or the other and cannot supply cooking heat from both directions simultaneously. Because of their random arrangement and uneven combustion, charcoal briquets do not provide a uniform source of heat. Furthermore, the cooking heat from burning charcoal can only be varied by physical adjustment of the distance between the firebox and the foodstuff, any such adjustment during the cooking process requiring gloves or the like for handling the hot components involved.

A further difficulty encountered with prior art grilling devices is excessive charring of food resulting from the uncontrolled flareup of grease falling on charcoal briquets. Grease ignited by the burning charcoal often produces a flame that comes into direct contact with the food. This carbonizes and discolors food surfaces and imparts a bad taste to the food. Although drip pans and other shields have been employed to intercept falling grease, insertion of such devices between the charcoal bed and the food holder leads to inadequate cooking of the food because the heating capacity of charcoal is relatively low and does not provide significant convection heat around such barriers. In addition, those vertical fireboxes found in the prior art are of a highly specialized construction designed only for the particular grill disclosed and are not readily adaptable for installation on pre-existing grilling units. Anyone wanting a vertical grill at the present time must purchase an entirely new and specialized unit with the attendant expense. This and all of the foregoing disadvantages are eliminated through the use of the present invention.

SUMMARY OF INVENTION

With the foregoing background and prior art in mind, the barbecue grill of the present invention has a vertical firebox that can be used alone or in combination with a horizontal firebox. Both fireboxes are gas fired and employ intervening refractory material for radiant or infrared cooking of the food in a highly efficient and tasty manner. Thus, there is provided an apparatus for barbecuing meat products such as poultry by means of radiant heat from the side or from below or from both directions simultaneously.

More specifically, the barbecue unit of the present invention incorporates in its construction an upright housing, a rotisserie mounted thereon for holding and turning food within the housing, and a vertical firebox assembly mounted within the housing to one side of the spit and including a gas fired burner arranged to support and heat an upstanding panel of ceramic material positioned to provide radiant heat for cooking food held on the rotisserie spit. The unit may also include a horizontal firebox structure incorporating a second gas burner within the housing below the spit and a bed of ceramic coals or other refractory material between the burner and the foodstuff. The vertical firebox itself has a detachable mounting and is specifically adapted for placement within the hood of barbecue grills of conventional design as an alternative source of cooking heat to the usual bed of charcoal briquets.

A pan mounted beneath the spit collects food drippings in both the vertical and combination units. Juices collected in the drip pan provide a source of basting for the cooking foodstuff. In the combination unit, juices falling on the pan may be evaporated by firing the heating components thereunder. This creates a moistening vapor that flavors the foodstuff and keeps it juicy and tender while being cooked by radiant heat from the vertical firebox and convection heat from the horizontal firebox. A horizontal openwork grill may be substituted for the drip pan in the combination unit to provide for conventional grilling of foodstuff placed on the grill over the bed of heated coals.

It is therefore a principal object of the present invention to provide a barbecue unit which is especially adapted for multiple purposes, namely, cooking food on a spit by radiant heat from the side, flavoring and tenderizing cooking food by slowly vaporizing juices from an underlying drip pan, flavoring cooking food by rapidly burning food drippings on an underlying bed of incandescent coals, cooking food on a spit by heat from below, broiling food on a horizontal grill by heat from below, or any combination of the foregoing.

Another object of the invention is to provide a multipurpose gas fired barbecue unit which is designed for ease and economy of manufacture and shipment, is readily portable from place to place, and is easily assembled for use and disassembled for cleaning.

A further object of the invention is to provide a barbecue grill which may be used for either spit cooking or grill cooking by selectively igniting separate gas fired burners, the heat rate of which may be finely controlled for either use.

Another principal object of the present invention is to provide a novel firebox construction permitting the use of standard gas heater radiants as a source of cooking heat in portable barbecue grills. The radiants are removably mounted on the grill housing in operable relation to the food holding member and a gas fired heat source.

Yet another object of the present invention is to provide a gas fired grill assembly which includes means for collecting juices emanating and falling from the cooking food and vaporizing the same at controlled rates.

A further object of the present invention is the provision of means in a portable barbecue grill by which non-collected juices and drippings undergo rapid combustion without excessive flareup.

Another object of the present invention is to provide an improved barbecue grill employing a panel of vertically extending self-supporting radiants heated by gas combustion to direct infrared heat against the food to be cooked.

Still another object of the invention is to provide a barbecue grill of the general type described with improved heat distribution and control and wherein accumulation of corrosive ash and food deposits is avoided.

A further object of the invention is to provide a barbecue grill wherein the food holding members and the heating members are mounted with fixed distances therebetween and the cooking rate is controlled by adjusting the rate of gas combustion.

A still further object of the invention is to provide a barbecue grill utilizing bottled gas fuel both in a vertical combustion chamber and in a horizontal combustion chamber.

Yet a further object of the invention is to provide a barbecue grill wherein a drip pan can be utilized with a vertical firebox to catch and collect drippings falling from the cooking food and with a horizontal firebox to vaporize such drippings to make the cooked food moist and tender and improve its flavor.

Another object of the present invention is to provide a portable barbecue grill having relatively fast temperature response to heating rate adjustments and the capacity to quickly and precisely adjust heating rate to provide the proper amount of heat for various stages of the cooking process and for various loadings of a variety of food products.

Still another object of the present invention is to prevent accumulation in the cooking unit of the waste products and grime associated with charcoal fired barbecue grills of the general type described.

Yet another object of the present invention is to provide a barbecue grill capable of imparting a variety of tastes and surface characteristics to the foodstuff being cooked, including grilled, smoked, roasted or barbecued tastes, and crisp or moist outer crusts.

A still further object of the present invention is to provide a barbecue grill capable of reliably providing cooking heat to all portions of the foodstuff held within the unit and of effectively regulating the relative amounts of radiant heat applied to the side and bottom of the foodstuff.

Another object of the present invention is to provide a combination barbecue unit including means for exposing cooking food selectively either to flavoring vapor generated by vaporization of drippings emanating from the food or to flavoring smoke generated by combustion of at least a portion of such drippings.

Still another object of the present invention is to provide a gas fired barbecue grill in which clogging of gas burner ports is prevented by locating the heating burner to one side of the cooking foodstuff out of the path of food drippings.

A further object of the present invention is to provide a portable, gas fired barbecue grill selectively adaptable for vertical spit grilling with or without flavoring vapor, horizontal spit grilling with flavoring smoke and with or without flavoring vapor, simultaneous vertical and horizontal spit grilling with flavoring vapor or flavoring smoke or both, or standard horizontal grilling on an open mesh wire grill with flavoring smoke and with or without flavoring vapor.

Yet another object of the present invention is to provide a vertical radiant heat source adapted to be detachably mounted within the cooking enclosures of a wide variety of conventional barbecue grills.

In addition to the numerous advantages apparent from the foregoing discussion, the present invention has the further advantages of simplicity, ruggedness, durability and ease and economy of construction and manufacture. The invention provides a practical, efficient and reliable barbecue unit that can be constructed from standard materials which are commercially available and which can be shaped and assembled with relatively few machine tools. The exact nature of the invention, as well as other objects and advantages thereof, will be readily apparent from the annexed drawings and the following specific description of the preferred embodiments of the invention.

DESCRIPTION OF DRAWINGS

For a better understanding of the present invention, reference is made to the accompanying drawings in which.

DETAILED DESCRIPTION OF PREFERRED EMBODIMENTS

Figure 1:
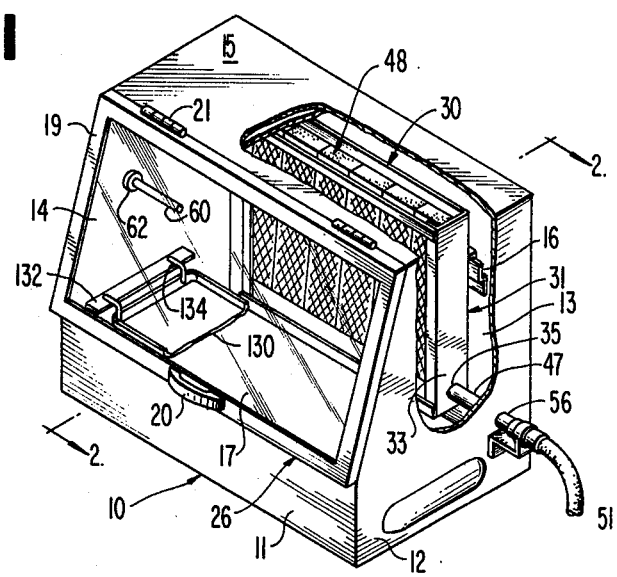
FIG. 1 is a perspective view of the basic barbecue unit with the vertical firebox assembly in position for spit barbecuing.
Figure 2:
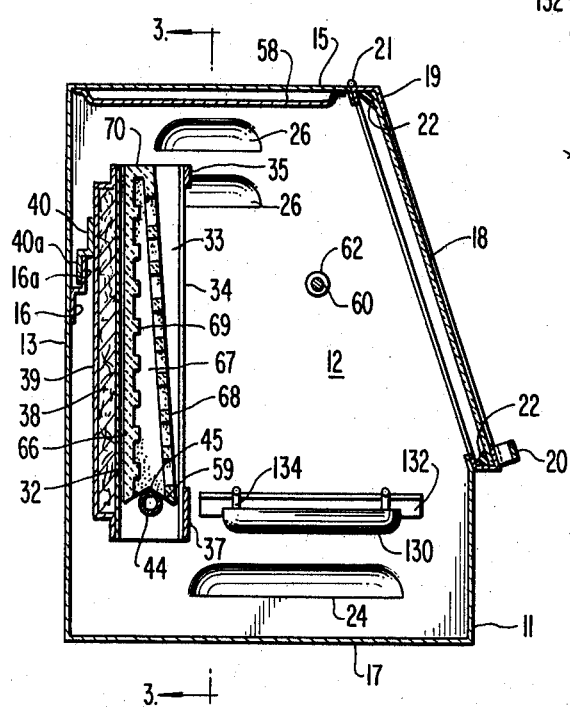
FIG. 2 is a side elevation of the invention taken along line 2—2 of FIG. 1 and showing structural details of the vertical firebox as detachably mounted on the grill housing.

Referring now to the drawings and particularly to FIGS. 1 and 2, there is illustrated one form of the gas fired barbecue grill made according to the present invention. The barbecue grill housing, generally designated 10, consists of a front wall 11, side walls 12 and 14, a rear wall 13, a top wall 15, and a bottom wall 17. Although shown as an integral structure in this embodiment, that portion of the housing extending above front wall 11 can be made in the form of a detachable enclosure similar to hood 170 in the modified embodiment of FIG. 4.

Preferably, the cooking area is fully enclosed by a door 26 pivotally mounted over the open front of the housing by means of a pair of hinges 21—21 at the front edge of top wall 15. The door includes a panel 18 of heat resistant glass or other transparent material mounted within a supporting frame 19 by glass mounts 22 around the inner glass periphery. Since it is desirable, but not necessary, to see within the cooking enclosure, a sheet metal panel of the same size and shape may be used in place of the glass panel. A handle 20 is mounted on the lower run of the door frame to facilitate opening the door and pivoting it back over top wall 15 for access to the interior of the grill housing.

At the rear of the cooking area within the grill housing and covering a major portion of the rear wall 13 is a vertical firebox assembly, generally designated 30. Firebox 30 is mounted upon the rear wall by means of a bracket 16 and includes an elongated, box-like frame, generally designated 31. Frame 31 is comprised of a pair of opposing end channel members 33—33 with side flanges 34, a rear wall 32 of sheet metal connecting the rear flanges of the channel members, and an upper cross-brace 35 and a lower cross-brace 37 across the front of the frame, connecting the front flanges of the channel members. The frame is open at both the top and the bottom. Preferably, a sheet of insulating material 38 contained within a sheet metal compartment 39 is mounted behind the frame on rear wall 32 to prevent excessive heating of the adjacent housing wall 13.

Attached to the rear surface of insulating compartment 38 is a hanger 40 having depending arm 40a positioned to engage the mounting bracket 16 so as to support the firebox frame in operable position. Bracket 16 and hanger 40 are of identical shape, but are inverted relative to each other. Each consists of a dogleg base rigidly secured to its abutting wall, as by welding or the like, and a dogleg arm stepped outward and running parallel to the wall to form a channel therewith. Thus, bracket arm 16a projects upward into the channel created by hanger arm 40a and hanger arm 40a projects downward into the channel created by bracket arm 16a in the interlocking relationship best illustrated in FIG. 2.

Figure 3:
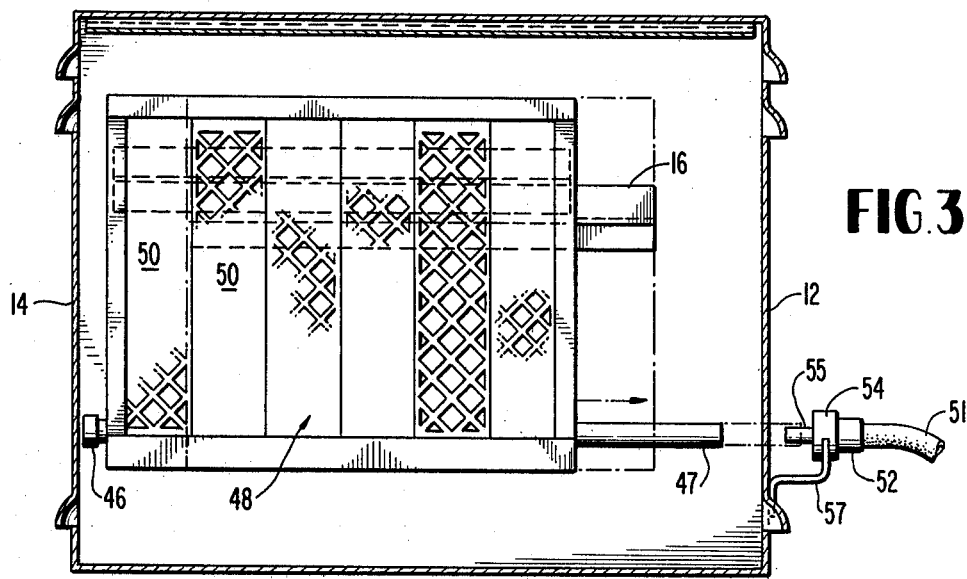
FIG. 3 is a front elevation of the invention taken along line 3—3 of FIG. 2 and illustrating one arrangement for detachably mounting the vertical firebox on the rear wall of the grill housing and detachably connecting the gas burner within the firebox to a source of gas fuel.

Extending longitudinally along the bottom of frame 31 is a tubular gas burner 44 having a series of longitudinally spaced gas discharge ports 45. The gas burner 44 passes through apertures 35 in channel members 33 and is thus carried by the frame 31 in this embodiment. With reference to FIG. 3, the inlet end 47 of the horizontal run of burner tubing is connected to a source of bottled gas (not shown) by means of a gas conduit 51 and associated coupling components. The gas coupling is detachable and includes an orifice 52 on the outlet end of conduit 51, and a supporting sleeve 54 which secures the orifice in horizontal and vertical alignment with an aperture 56 in the housing side wall 12. Sleeve 54 is mounted on the housing side wall 12 by means of a bracket 57 welded to the side wall near its bottom rear corner. Gas orifice 52 has a discharge nozzle 55 which fits within burner inlet end 47 so as to convey a proper air-gas mixture to the burner ports. Burner 44 is connected to the orifice by inserting tubing end 47 through wall aperture 56 and over nozzle 55 as illustrated in dotted outline in FIG. 3. The terminal end of the burner tubing is closed by means of a cap or sealing crimp 46.

Figure 4:
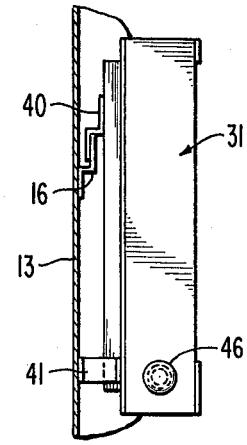
FIG. 4 is a partial side elevation of the invention showing the mounting bracket for laterally supporting the lower portion of the vertical firebox adjacent to the terminal end of its gas burner.

The gas burner connection at 47-55 provides lateral support to the lower portion of the firebox so as to hold the lower end of frame 31 outward from rear housing wall 13 at the same distance that the upper end is held by the frame mounting components 16 and 40. A U-shaped spacer bracket 41 is preferably mounted at the rear of the frame adjacent to the terminal end 46 of the gas burner to provide additional lateral support to the lower frame at its far end as shown in FIG. 4.

Mounted within the firebox frame is an upstanding refractory panel, generally designated 48, comprised of a plurality of vertically extending ceramic radiants 50 of the type previously employed in conventional gas fired space heaters. The radiants are wedge shaped in transverse elevation with their forward face inclined upwardly from a wide bottom to a relatively narrow top as best shown in FIG. 2.

The body of each radiant is hollow and includes a solid rear wall or panel 66 and an open latticework front wall or panel 68 integrally joined at their side edges by a pair of sidewalls 67—67 and at their top edges by a top wall 70. The latticework of pannel 68 is of the usual crisscross construction with openings defined by the crossed strips of refractory material and may be of any openwork design. As the strips of most designs cover less than half of the panel area, heat emitted from the radiant surface of the rear panel passes freely through the openings of the second panel where it combines with radiant heat emitted from outer surfaces of the latticework itself. The heated surface area of either panel may be increased by surface ridges or projections such as at 69. In the preferred embodiments, the sidewalls 67 have a lateral notch or inverted V-shaped passage 59 at their base for receiving and transversely engaging the cylindrical burner wall to vertically and laterally support the radiant body and align its radiant surfaces relative to the longitudinal axis of the burner. Although a plurality of standard gas heater radiants with fore and aft panels have been utilized, it is to be understood that the invention also contemplates the use of a single integrally formed radiant panel extending longitudinally along the entire length of the burner run and having similar transverse side walls or equivalent components for engaging the burner surface. The panel may also be positioned to the side of the spit at different heights and corresponding angles of incline so long as it remains out of the path of drippings with the heat from its radiant surface directed toward the food holding area of the spit.

To supply the ventilation necessary for proper gas combustion, an air inlet louver 24 and a pair of exhaust louvers 26—26 are provided in each side wall. The inlet louvers 24 feed air into the housing below the level of the gas burner 44 and exit louvers 26—26 remove exhaust gases from the housing at locations adjacent to the upper end of the radiant panel 48. A heat baffle 58 is provided along the underside of top wall 15 to deflect hot gases toward the exhaust louvers and keep upper surfaces of the wall relatively cool.

With particular reference to FIGS. 2 and 3, the various components of the vertical firebox 30 can be readily assembled outside of the housing 10 and then easily mounted therein as a composite unit. Tubular gas burner 44 is first inserted longitudinally through aperture 35 in each end channel 33 to form an underlying support member for the radiants inside the frame along and adjacent to its open bottom. Next, the individual radiants 50 are inserted through the open top of the frame to rest upon the burner 44 as shown in FIG. 2. The weight of each radiant causes the inverted V-shaped passages 59—59 at the base of its sidewalls to center upon the arc of the cylindrical burner surface so as to support the base both vertically and transversely. The passages 59—59 also align each radiant body so that corresponding panels of abutting radiants are positioned in the same plane to form a single composite panel upstanding from and extending longitudinally along the tubular burner. By reason of the weight difference between the latticework front wall and the solid rear wall of the radiant body, gravitational forces similarly cause the rear panel of the radiants to rest against rear wall 32 for transverse support at their top when the frame is in its upright position. Upper brace 35 and lower brace 37 are positioned vertically across the open front of the frame to retain the radiants within the frame proper should it be tilted sufficiently during installation or removal to shift the center of gravity of the radiant bodies forwardly of the burner's longitudinal axis.

After insertion of the radiants within the frame, housing door 16 is pivoted out of the way around hinges 21—21 and the radiant frame is inserted and mounted within the housing by slipping hanger arm 40a over bracket arm 16a at the rear of the housing interior. In the illustrated embodiment, the firebox is first positioned with its left end immediately adjacent to sidewall 14 to avoid interference between projecting burner end 47 and sidewall 12. When the firebox has been properly hung with its weight carried by bracket 16, the entire assembly is shifted to the right as illustrated in dotted outline in FIG. 3 to slip burner end 47 over gas nipple 55. The vertical firebox is then in operable position and may be lighted from the front upon opening the heat control valve (not shown) in the gas supply line to feed gas to the burner.

The barbecue grill is fitted with a conventional rotisserie unit having a food holding spit 60 mounted at each end for rotation on the sidewalls 12 and 14 by means of journals 62—62. The spit extends horizontally across the housing enclosure with its food holding section adjacent to the front of the cooking area and its rotational axis approximately opposite to the middle of the upstanding radiants. Food engaging prongs 63 may be mounted upon the spit 60 by means of a collar 64 as illustrated in FIG. 4 of the drawings. The rotisserie motor and related components are not shown since the entire rotisserie unit may be of a conventional design such as that shown in the patent to Topper, U.S. Pat. No. 3,019,720 of Feb. 6, 1962.

The preferred embodiment of the invention contemplates the use of a drip pan 130 below the rotisserie spit to catch juices and other drippings falling from roasting foodstuffs. Drip pan 130 may be of conventional design and is detachably mounted between an angle iron bracket 132 on each opposing sidewall of the housing by means of a pair of support rods 134—134 at each end of the drip pan. Both the rotisserie spit 60 and the drip pan 130 are removable from the housing to permit insertion and removal of the vertical firebox structure as previously described.

As will be readily understood from the foregoing description, the vertical firebox assembly of the present invention can be installed within the hood of any conventional barbecue unit. All that is required to accomplish such installation is the addition of a mounting bracket similar to bracket 16, a lower rear spacer similar to member 41, and a gas supply unit with nipple such as 55. Should a suitable rear wall be lacking, the bracket and spacer can be mounted on an auxiliary rear panel secured within the conventional hood. After mounting the firebox, an aperture aligned with the burner run is cut in the hood as at 56 and a gas supply unit identical to that of FIG. 1 is mounted adjacent thereto in the manner illustrated.

Figure 5:
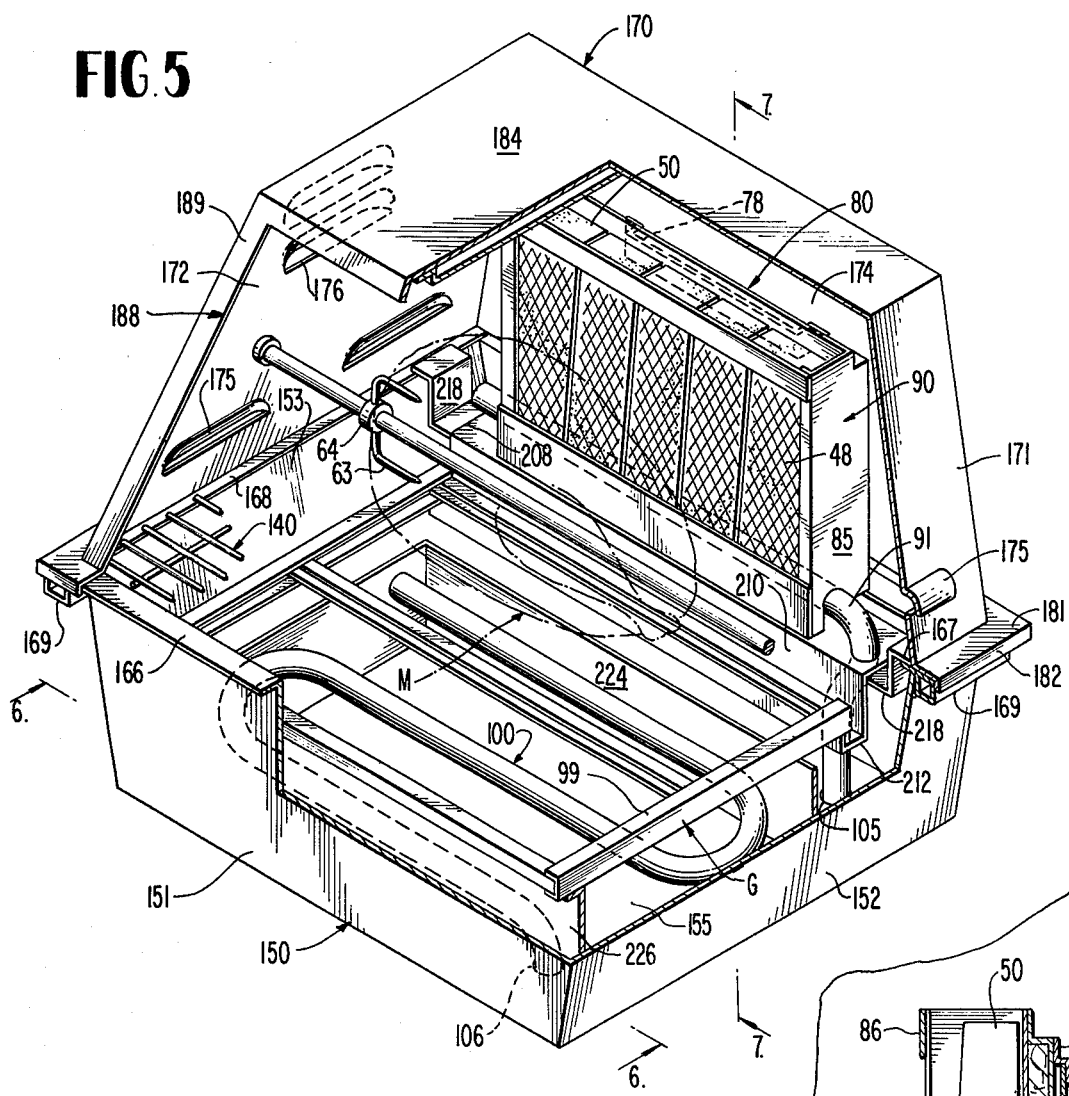
FIG. 5 is a perspective view of a modification of the invention showing both vertical and horizontal firebox assemblies detachably mounted within the grill housing.
Figure 6:
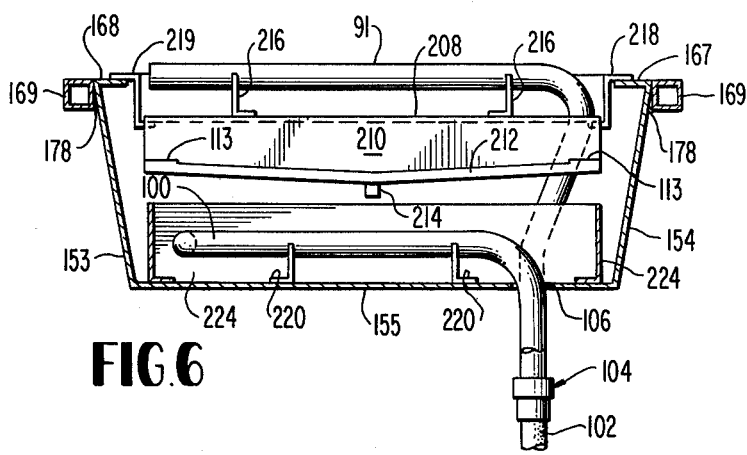
FIG. 6 is a partial front elevation of the modified invention taken along line 6—6 of FIG. 5 and showing structural details of the components for mounting tubular gas burners in both the vertical and horizontal fireboxes.
Figure 7:
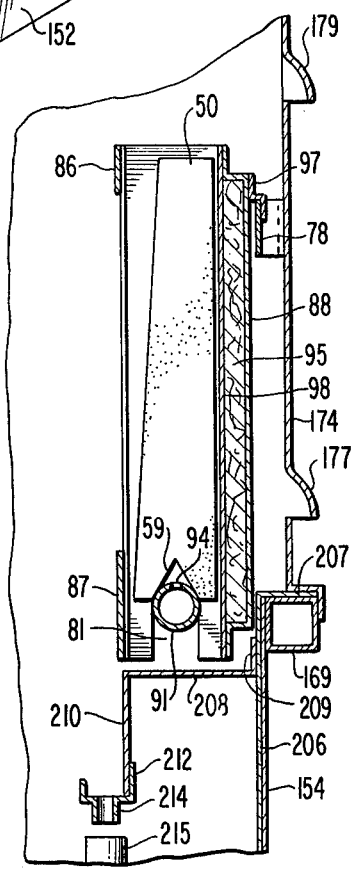
FIG. 7 is a partial side elevation of the modified invention taken along line 7—7 of FIG. 5 and showing details of the structure for mounting the vertical firebox assembly on the detachable upper hood and within the lower housing pan.

Now with reference to FIGS. 5, 6 and 7, there is illustrated a modification of the invention wherein a vertical firebox assembly, generally designated 80, is combined with a horizontal firebox assembly within a lower housing or pan, generally designated 150. Except for the burner and its mounting, construction of the vertical firebox 80 is practically identical to that of firebox 30 previously described. Thus, the same vertical radiants 50 are used to form fore and aft panels of self-supporting refractory material in spaced relation to the rotisserie spit 60. In this instance, five abutting radiant bodies are used instead of six. The radiants are each supported within the firebox frame 90 by burner 92 which engages the inverted V-shaped passage 59 in the same manner as burner 44. The modified frame 90 also includes a rear insulating panel 95 and a dogleg hanger 97 secured to rear compartment 88 of the firebox 90.

The mounting of the modified frame 90 differs significantly from that of the first described embodiment in two main respects. First, a U-shaped mounting bracket 78 is used in place of the open-sided dogleg type of bracket. As best illustrated in FIG. 5, clip 78 has rearwardly extending legs at opposite ends that are secured to the rear wall of the housing or hood by welding or the like. Secondly, the gas burner is installed as a separate independently mounted component and the end channels 85—85 of the frame also rest upon the tubular gas burner 91 along with the radiants 50. As shown in FIG. 7, the horizontal run of burner 91 fits within slots 81 in the base of each channel member 85. Preferably, the slots 81—81 have rounded bottoms conforming to the outer radius of the burner tubing.

The modified frame 90 also includes an upper brace 86 and a lower brace 87 across the front of the frame between the forward flange of end channels 85—85. Rear wall 98 similarly connects the rear flange of opposing channel member.

The horizontal pass 150 consists of a front wall 151, opposing sidewalls 152 and 153, rear wall 154, and bottom wall 155. To strengthen the firebox walls and also to provide special seating surfaces as discussed below, front wall 151 has an outwardly projecting integral ledge 166, and sidewalls 152 and 153 have inwardly projecting integral ledges 167 and 168, respectively. Although rear wall 154 does not have an integral seating ledge as such, an auxiliary reinforcing wall 206 abuts the rear wall and has an outwardly projecting ledge 207 overlying its upper edge as shown in FIG. 7.

The housing of the modified barbecue unit includes a separate hood component, generally designated 170, which consists of inwardly sloped sidewalls 171 and 172, a vertical rear wall 174 and top wall 184 as shown in FIGS. 5 and 7. Each sidewall is provided near its base with an inlet air louver 175 and near its top with a pair of outlet or exhaust gas louvers 176—176. Similarly, rear wall 174 is provided with an inlet air louver 177 and an exhaust gas louver 179. Hood 170 is open at the front where the front edge of each sidewall is sloped rearwardly. The front opening 188 is surrounded on three sides by a strip 189 which slopes from bottom to top in conformity with the rearward slope of the adjacent sidewall edges. The hood front may be either left open as illustrated in FIG. 5 or enclosed by a swinging glass panel door similar to housing door 16 of the first embodiment. Top wall 184 is protected from hot combustion gases rising from the vertical firebox by underlying heat baffle 185.

An outwardly projecting flange 181 with a depending outer ridge 182 extends around the lower edge of the hood walls. Flange 181 is thus positioned around the base of the hood so as to rest upon supporting surfaces around the upper edges of the horizontal firebox walls.

With respect to front wall 151, ledge 166 serves as the supporting ledge for the front of the hood. Since neither the side nor rear walls have outwardly projecting ledges, a special supporting structure is provided for those walls. Referring now to FIG. 7, a reinforcing rear wall member 206 abuts, but is not secured to rear wall 154. The upper portion of the auxiliary wall 206 is bent outwardly to form a projecting rear ledge 207. Since ledge 207 carries the major portion of the weight of the vertical firebox 80, a rectangular channel member 169, preferably of square cross section, is positioned thereunder and rigidly secured to the rear surface of wall 154 as by welding. Channel 169 is not attached in any way to the underside of projecting ledge 207 so that auxiliary wall 206 and related structure are removable from the underlying pan as discussed below.

Similarly, to provide a seating surface for the grill hood along the sidewalls 152 and 153, the rectangular channel member 169 extends around the juncture between the rear and sidewalls and runs forwardly along the upper edge of the sidewalls to a position abutting a side extension of front ledge 166 to which it is also secured by welding. To further strengthen the forward runs of channel 169 and provide lateral support thereto, a spacer rod 178 is welded between the outer surface of the sloping sidewalls and the lower inside corner of channel 169 as illustrated in FIG. 6.

Thus, outwardly projecting hood supporting ledges are provided around the upper periphery of the horizontal firebox pan by front ledge 166 and the side and rear runs of channel 169. The width of flange 181 is such that depending ridge 182 slips snugly over the outer periphery of the supporting ledges so as to center and hold the hood upon the lower firebox unit. The weight of hood 170 firmly seats the hood against horizontal displacement once it is in place over the horizontal firebox. However, the hood can be readily detached by raising it a sufficient distance to bring ridge 182 clear of abutting surfaces.

A particularly pertinent feature of the modification disclosed is the independent mounting arrangement for vertical burner 91 which in turn supports the radiants 50 and engages the bottom portion of the vertical frame itself as previously described. The burner mount consists of a horizontal platform 208 having an upstanding rear flange 209 rigidly secured to auxiliary rear wall 206 and a dogleg hanger 218 on the end adjacent to sidewall 152 and a dogleg hanger 219 on the opposite end adjacent to sidewall 153, the hangers being detachably seated upon inward ledges 167 and 168, respectively. A pair of burner brackets 216—216 secured to the central portion of portion 208 cradles the horizontal run of vertical firebox burner 91 as illustrated in FIG. 6. The vertical run of burner 91 passes freely through an aperture 105 in the pan floor 155 and is detachably connected to a gas supply conduit 102 by means of a coupling 104 which includes a gas orifice similar to orifice 52 of FIG. 1. It is to be understood that the burner and its supporting platform, together with auxiliary wall 206 and other attached components, are free to be lifted out and separated from the horizontal firebox assembly when the hood and vertical firebox are removed.

Depending from platform 208 is a forward panel 210 upon which is mounted a U-shaped channel 212 arranged to support the rear end of a grate G for carrying a bed of ceramic or refractory lumps or coals. The forward end of coal grate G is supported by an upstanding panel member 226 secured to the front end of a horizontally disposed rectangular heat baffle 224 resting upon the floor of the firebox pan as illustrated in FIG. 5. Preferably, the outer ends of the channel 212 have grill seating surfaces 113 and the center portion of the channel slopes toward the center of the grill and is provided there with a drain tube 214 below which a container 215 may be positioned for collecting any grease or drippings caught by or conveyed to the channel member 212.

Figure 8:
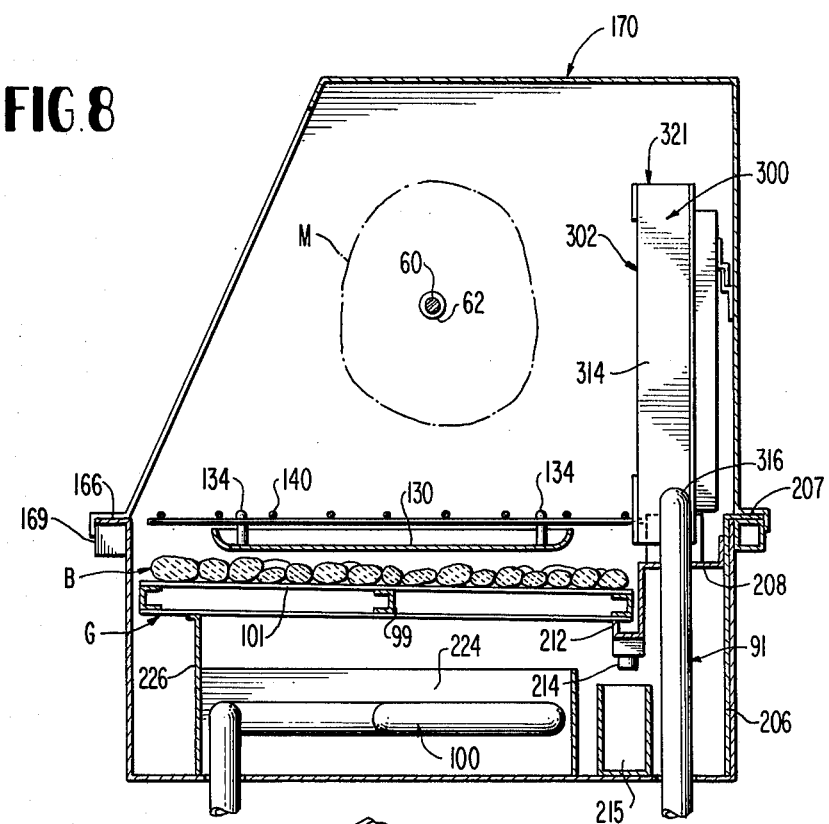
FIG. 8 is a side elevational view of another modification of the invention wherein the vertical firebox contains ceramic lumps or coals instead of ceramic plates.

Below coal grate G is a conventional "S" type tubular gas burner 100 which, in conjunction with a bed of ceramic coals B as shown in FIG. 8, provides a source or radiant cooking heat from below the spit. The burner 100 is mounted within the horizontal firebox by means of three pairs of brackets 220—220 secured to bottom wall 155, one pair of brackets cradling each of the three side to side runs of the S-shaped burner. The brackets for one run are illustrated in FIG. 5. The horizontal baffle 224 surrounds the horizontal runs of the burner containing the gas exit ports. As the terminal end of the burner passes through an aperture in heat baffle 224 as illustrated in FIG. 5, additional support is provided at that point. It is to be understood that the coal grate G includes the usual cross-braced frame 99 with a series of front to rear stringers 101 for supporting the bed of ceramic lumps or coals. The stringers and the coal bed itself have been omitted from FIG. 5 for purposes of clarity. The modified grill unit also utilizes the standard rotisserie unit previously described to hold the foodstuff M in position to be cooked in front of the vertical firebox and above the horizontal firebox.

It is also within the contemplation of the present invention to utilize a conventional open mesh cooking grill 140 of welded rod construction within the hood above the coal grate when standard horizontal grill cooking is desired. The grill 140 is readily mounted between inwardly projecting side ledges 167 and 168 on opposing sidewalls 152 and 153, respectively. Such a cooking grill may either be removed during spit cooking operations or left in place if the size of the foodstuff on the spit is such that the grill does not interfere with the rotation thereof. If left in place, the unit can be used simultaneously for both grilling upon the wire grill and spit barbecuing on the spit shaft when both burner units are burning simultaneously. So that the heat rate can be precisely and independently adjusted for horizontal grilling, spit roasting and other cooking combinations as set out in the preceding objects of this invention, separate gas control valves (not shown) are provided for the vertical burner 91 and the horizontal burner 100.

As best illustrated in FIG. 7, the length of hood sidewalls 171 and 172 is such that the rear wall 174 is stepped to the rear of underlying pan wall 154 by a distance equivalent to the rearward depth of support bracket 78. When placed in abutment with pan wall 154, auxiliary wall 206 then holds platform 208 and burner 91 in proper position to laterally support the lower portion of the vertical firebox and vertically align the radiant panel relative to the food holding spit. The need for auxiliary support at the base of the frame, such as channel 41 in FIG. 4, is thereby eliminated.

From the foregoing description, it can be seen that the modified barbecue unit can be readily assembled and disassembled in a manner similar to that of the first embodiment. Thus, the major components of the unit are adapted for shipment disassembled and for easy assembly at home or in retail stores. In assembling the combination unit, the horizontal pan 150 is first suspended in a portable rectangular frame (not shown)

arranged to engage the underside of peripheral channel 169 in conventional fashion. The firebox pan comes with burner apertures 105 and 106 in the bottom wall thereof. Heat baffle 224 is first inserted in the pan and then the horizontal burner 100 is inserted within the baffle 224 with its depending run passing through bottom wall aperture 106. Thereafter, the vertical burner support with burner 91 suspended upon platform 208 is placed in the pan with the depending run of this burner passing through aperture 105. Platform 208 is pushed back into position until its auxiliary supporting wall 206 abuts rear wall 154, end flanges 218 and 219 resting upon inward sidewall ledges 167 and 168. Coal grate G is then suspended between the support members 212 and 226 and a bed of refractory coals laid thereon. At this point, the unit may serve as a horizontal cooking grill by suspension of wire grill 140 between wall ledges 167 and 168.

If spit barbecuing is desired, assembly of the combustion unit would continue. Next, the hood 170 would be positioned over and seated upon the horizontal pan 150 (with cooking grill 140 removed). Vertical firebox frame 90, which alone has no radiant supports, is then mounted within the hood by slipping end slots 81—81 over the burner 91 while simultaneously fitting hanger 97 into the vertical slot defined by rear wall clip 78. With the vertical frame in place, individual radiants 50 are inserted through the front opening of the frame by first tilting them backward and slipping their tops upward under top crossbar 86 until their base clears bottom crossbar 87. Each radiant is then lowered down onto the burner so that groove 59 engages the upper burner surface and centers the radiant body over burner ports 94. At this juncture, assembly of the two firebox components is complete and the burners may be connected to a source of bottled gas and the rotisserie unit installed.

Figure 9:
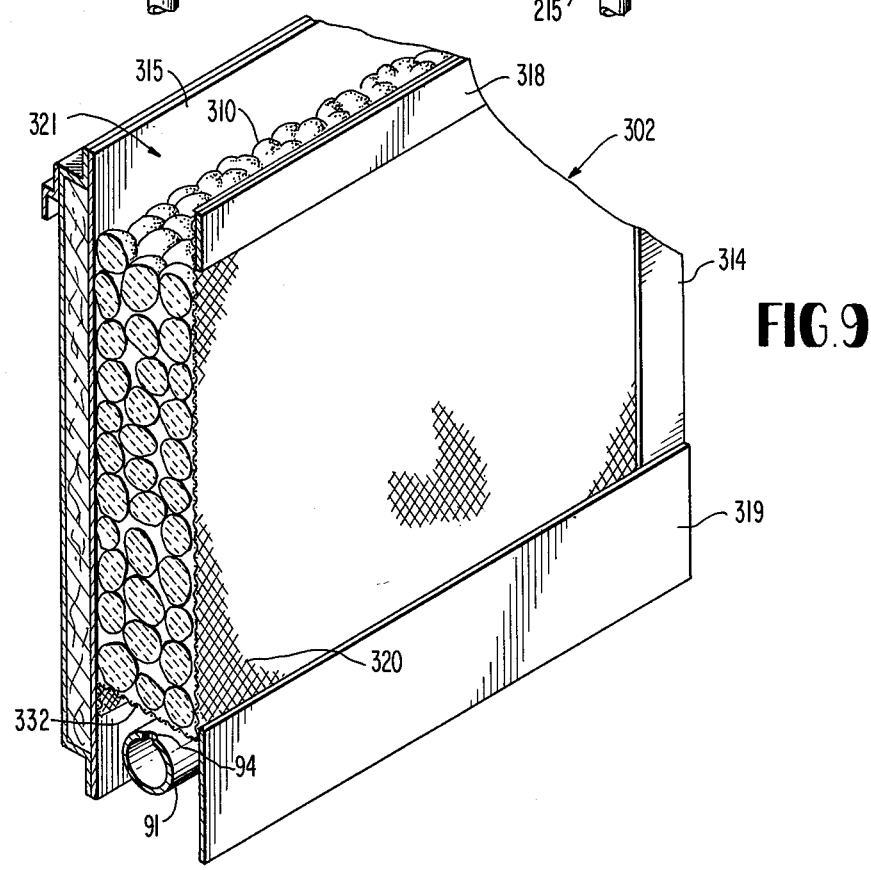
FIG. 9 is a fragmentary perspective view showing structural details of the modified firebox of FIG. 8 for mounting ceramic lumps in a radiant panel above the gas burner.

With reference to FIGS. 8 and 9, a second modification of the invention is disclosed wherein the upstanding panel of the vertical firebox has a radiant face 302 and is comprised of refractory lumps or briquets 310 retained by a screen 320. The modified firebox, designated 300, is mounted in the combination unit in place of firebox 90. All components other than the vertical firebox proper are the same as previously described and bear the same numerical designations in the drawings.

As best shown in FIG. 9, the modified firebox 300 includes a pair of flanged end channels 314—314 connected by rear wall 315. Slots 316—316 in the base of each channel member fit over the horizontal run of burner 91 to provide both vertical and lateral support to the base of the frame as previously described. The forward flanges of the opposing end channels are connected by an upper cross-bar 318 and a lower cross-bar 319. A metal rod lattice or screen 320 of high temperature steel extends across the open front of the frame between end channels 314—314 and between the upper bar 318 and to the top edge of lower bar 319, where it is secured by welding or the like. Adjacent to the top edge of bar 319, screen 329 is bent inward at a 90° angle to form a horizontal leg or run 322 extending between the inner face of each end channel from the forward cross-bar 319 to the rear wall 315 where it is bent downward and secured by welding or the like.

A rectangular container open at the top and with wire mesh walls at the front and bottom is thereby formed to support a plurality of ceramic lumps or coals in a panel-like structure extending vertically above the gas burner 91. The panel is assembled before insertion in the barbecue unit by placing the refractory lumps in the firebox frame through the open top 321. The vertical firebox structure is then inserted in the unit over the burner assembly as previously described for firebox 90. The burner 91 as mounted upon the platform 208 and related components properly align the resulting radiant panel relative to the food holding spit.

In using the combination units, either the horizontal or the vertical burner, or both, may be lighted, depending on the direction and degree of heat desired. Preferably, each burner is separately valved with a fine adjustment gas control so that the heat output of both the horizontal and vertical heating components can be precisely regulated for the type and style of cooking desired. It is also to be understood that the drip pan 130 may be either substituted for the wire grill 140 of FIG. 5 or both elements used in combination within the modified units as shown in FIG. 8. When the drip pan is installed, convection heat only would be available from burner 100 to areas of spit 60 or grill 140 above the pan.

With the novel design and construction shown, it has been found that an extremely versatile and relatively inexpensive barbecue unit can be provided for on-site assembly. Although of compact construction, the unit has a very broad heating range within which the temperature can be adjusted to cook any food susceptible of being cooked in a conventional kitchen oven. The radiant panel to one side allows the food to be cooked without any grease or drippings falling on the heating surfaces, eliminating any smoke flavoring where desired. Nevertheless, when such flavoring is desired, the horizontal firebox assembly may be fired to rapidly burn the drippings at high efficiency and produce a barbecue-like smoke for flavoring the cooking foodstuff. In addition, when the drip pan is placed between the horizontal refractory bed and the cooking foodstuff, yet another flavoring technique is available. Depending on the heat rate selected for burner 100, the drippings may be either burned to produce flavoring smoke or merely vaporized at low heat to produce a moist flavoring and tenderizing vapor. Of course, various combinations of smoke and vapor are also available. Furthermore, the use of a drip pan allows flavoring ingredients, such as barbecue sauce, to be mixed with food drippings. This both changes the composition of flavoring vapors and allows direct basting of the cooking foodstuffs, providing still further variations in culinary procedure.

The relative rates of vaporization and combustion of drippings and flavoring sauces are readily controlled by regulating the heat output of the horizontal burner. Similarly, the rate of cooking the foodstuff internally and the amount of radiant heat to which its surface is exposed during the cooking process can be regulated in a number of fashions by adjusting the heat output of the vertical firebox unit relative to that of the horizontal firebox unit and in some instances, by using the drip pan as a radiant heat shield.

Although but a few embodiments of the present invention have been described, other embodiments and variations will occur to those skilled in the art. It is possible, of course, to use various features of the specific embodiments described, either separately or in various combinations, and such uses are within the contemplation of the present invention. Furthermore, many structural changes are possible, such as various mountings for the vertical firebox assembly, and those changes are intended to be within the scope of this disclosure. It is also to be understood that the foregoing drawings and specification merely illustrate and describe preferred embodiments of the invention and that other embodiments are contemplated within the scope of the appended claims.

I claim:

1. In a portable gas-fired cooking unit having a housing with upstanding walls at the rear and on each side thereof and horizontally extending walls across the top and bottom thereof to define a cooking area and a food holding spit mounted on said housing for rotation within said cooking area adjacent to the front thereof, the improvement which comprises:
   a. A ledge on each sidewall extending forwardly from said rear wall and projecting inwardly into said cooking area, said ledges being arranged in spaced apart opposing relationship;
   b. An elongated platform having an end adjacent to each of said ledges and suspended longitudinally therebetween in spaced relation to the bottom wall of said housing;
   c. Means for supporting each end of said platform on the ledge to which it is adjacent;
   d. An upstanding panel of refractory material extending longitudinally in spaced relation to the rotational axis of said spit and having one face arranged to radiate thermal energy toward the food holding area of said spit upon heating of said panel;
   e. A gas burner extending longitudinally along said platform and having port means for distributing gas to be burned thereabove;
   f. Support means attached to said platform for detachably mounting said gas burner upon said platform;
   g. Vertical frame means supporting said refractory panel within said frame and above said burner in position to be heated by the burning of gas distributed by said port means, said frame including forward wall means for preventing lateral movement of said panel while passing cooking heat from said radiant face and a rear wall arranged to intercept thermal energy radiated by the other face of said panel;
   h. Upper mounting means mounting said frame upon said rear housing wall with the base of the frame over the platform and the upper portion of the frame in spaced relation to the rear housing wall;
   i. Means for mounting the base of said frame upon said platform comprised of an element on said frame and an element carried by said platform with said elements cooperating to support the base of said frame in spaced relation to the rear housing wall, both of said frame mounting means restraining lateral movement of the frame and said upper mounting being detachable from said rear housing wall and said base mounting means being detachable from said platform upon vertical movement of the frame within the cooking area beneath said top housing wall; and
   j. Conduit means for supplying flammable gas to said burner.

2. A portable cooking unit according to claim 1 wherein the improvement includes a second gas burner extending horizontally beneath said spit and having port means for distributing gas to be burned thereabove, a second refractory panel positioned between said second burner and said spit and having a horizontally extending radiant face arranged to radiate thermal energy upward toward the food holding area of said spit upon heating of said panel, a grate means having a frame extending horizontally from the front toward the back of the cooking area of said housing and arranged to support said second refractory panel above said second burner in position to be heated by the burning of gas thereabove, means adjacent to the front of said housing for supporting said grate frame at its forward end, and means carried by said elongated burner platform for supporting said grate frame at its rear end.

3. The improvement in a portable cooking unit according to claim 2 wherein said burner platform includes means for collecting food drippings conveyed from the cooking area of said housing.

4. The improvement in a portable cooking unit according to claim 1 wherein said upper frame mounting means includes an element carried by said frame and an element carried by said rear wall with said elements cooperating to support the upper portion of said frame in spaced relation to said rearwall; and wherein said frame base mounting means includes an element carried by said frame for engaging said burner to support the lower portion of said frame in spaced relation to said rear wall.

5. In a portable cooking unit wherein said upstanding housing walls are divided to form an overlying hood portion and an underlying pan portion, the improvement according to claim 4 wherein said platform supporting ledges are carried by said pan portion and said wall element of the upper frame mounting means is carried by said hood portion so that said refractory frame is removable with said hood portion upon detachment of the base of said frame from said platform.

6. The improvement in a portable cooking unit according to claim 4 wherein said frame means includes a panel of insulating material mounted between said rear frame wall and the upstanding rear wall of said housing, and wherein said upper frame mounting element is carried by said insulating panel.

7. The improvement in a portable cooking unit according to claim 1 wherein said upstanding panel is comprised of an upwardly extending stack of refractory lumps and said frame includes opposing sidewalls, a forward wall of open latticework arranged as the radiant face of said panel and a bottom wall of open latticework adjacent to the port means of said burner, said side, forward and bottom walls cooperating with the rearwall of said frame to form a container for holding said stack of refractory lumps in an upstanding panel positioned above said burner so that the combustion products of burning gas flow upwards through said bottom wall, around said refractory lumps and out of said forward wall so as to heat said panel.

8. The improvement in a portable cooking unit according to claim 1 wherein said platform supporting ledges extend forwardly of said spit and there is mounted therebetween in a position underlying said spit an auxiliary cooking member selected from the group consisting of a horizontal food supporting grate, a drip catching pan and a food basting pan.

9. The improvement in a portable cooking unit according to claim 1 wherein said burner platform abuts the rear housing wall and includes means for engaging said rear wall to restrain lateral movement of said platform and maintain said abutting relationship.

* * * * *